United States Patent [19]

Okada

[11] Patent Number: 5,020,063
[45] Date of Patent: May 28, 1991

[54] LASER APPARATUS

[75] Inventor: Toshiharu Okada, Ibaraki, Japan

[73] Assignee: Matsushita Electric Industrial Co., Ltd., Kadoma, Japan

[21] Appl. No.: 450,480

[22] Filed: Dec. 14, 1989

[30] Foreign Application Priority Data

Dec. 21, 1988 [JP] Japan .................................. 63-322649

[51] Int. Cl.$^5$ .............................................. H01S 3/10
[52] U.S. Cl. ......................................... 372/34; 372/33; 372/21
[58] Field of Search .................. 372/21, 22, 33, 26, 372/34, 29, 9, 31; 307/425, 427; 338/24

[56] References Cited

U.S. PATENT DOCUMENTS

| 4,025,875 | 5/1977 | Fletcher et al. | 382/18 |
| 4,181,899 | 1/1980 | Liu | 372/21 |
| 4,400,682 | 8/1983 | Ishibashi | 338/4 |

Primary Examiner—Frank Gonzalez
Assistant Examiner—Susan S. Morse
Attorney, Agent, or Firm—Cushman, Darby & Cushman

[57] ABSTRACT

The frequency conversion element for producing light of higher harmonic wave from the fundamental wave laser oscillator is provided with strain gauges 4, 4 or piezoelectric elements 4', 4' or thermo-couples 6, 6, output signals whereof are led to a signal processor and to a comparator, thereby to issue a control signal to decrease power of the input laser light, to prevent thermal breakdown of the frequency conversion element.

5 Claims, 5 Drawing Sheets

Comparator

LASER APPARATUS

FIELD OF THE INVENTION AND RELATED ART STATEMENT

1. Field of the Invention

The present invention relates to a laser apparatus, and more particularly, frequency conversion part of the laser apparatus.

2. Description of the Related Art

Recently, applications of laser apparatuses are widely spreading for application in the field of metal working, metal welding, and further to extremely fine working in electronics components, etc. In order to apply such very fine working, it becomes necessary to converge the laser beam into a very small spot. And therefore, a great demands arises for laser apparatus which generates laser light of a very short frequency. Generation of higher harmonic wave is an important means to produce the laser light of very short frequency.

The conventional way of generating higher harmonic wave of the laser light is described with reference to the accompanying drawing FIG. 3.

FIG. 3 is a perspective view showing the conventional higher harmonic wave generating part of the conventional laser apparatus. A frequency conversion element 1 is held in a holder 2 on a path of a laser beam 3 coming from a known oscillator (not shown). When a certain condition of parameters between the strength, parallelism, incident angle to the frequency conversion element 1 of the laser beam are satisfied, the incident laser light 3 is converted to the light of higher harmonic wave owing to non-linear optical effect; and from the frequency conversion element 1, the frequency-converted light 8 and light of the original frequency are issued. The frequency conversion element 1 absorbs a part of light energies of the original fundamental frequency laser light and higher harmonics wave laser light, and is heated to a certain extent. And in an extreme case, the frequency conversion element 1 is destroyed by thermally induced strain. Accordingly, in general, the upper limit of the power of the incident fudamental frequency light is preliminarily set to be under a safe low level, and the laser oscillation is carried out so as to keep the incident power under a power limit to prevent breakdown of the frequency conversion element.

However, there is the problem that even though the strength of laser beam incident to the frequency conversion element 1 is the same, the permissible upper limit of the input light to the frequency conversion element 1 varies depending on shape of the element 1. And further, the permissible upper limit varies one by one of the individual frequency conversion elements 1 depending on variety of individual quality of the elements even though the shape and type thereof is the same. Therefore, there is a possibility that the allowable limit of thermally induced strain is not uniform when the frequency conversion element 1 is interchanged. Furthermore, depending on the environmental condition around the frequency conversion element, the thermal strain of the element will vary. Therefore, in order to prevent breakdown of the frequency conversion element 1, hitherto the permissible upper limit of the light intensity (power) of the incident laser light has been determined sufficiently lower than actual limit for individual element, and furthermore, the environmental conditions around the frequency conversion element is carefully controlled. However, such determining of the upper limit of the incident laser light power at a level very much lower than the actual upper limit for individual element will lower the generation efficiency of the higher harmonic motion laser light, and further, the controlling of the environmental conditions necessitates a considerable expense.

OBJECT AND SUMMARY OF THE INVENTION

In order to solve the above-mentioned problems, the laser apparatus in accordance with the present invention is improved so that the frequency conversion element 1 is not destroyed by the thermal strain, thereby to achieve a high frequency conversion efficiency without fear of the breakdown or destruction of the frequency conversion element.

The laser apparatus in accordance with the present invention comprises:

a frequency conversion element for producing higher harmonic wave light by receiving light from a laser which is oscillating in fundamental frequency and detection means for detecting thermally induced change at surface of the frequency conversion element.

In the above-mentioned laser apparatus, the frequency conversion element especially comprises a crystal consisting fundamentally of potassium titanium phosphate ($KTiPO_4$).

It will be recognized that some or all of the Figures are schematic representations for purposes of illustration and do not necessarily depict the actual relative sizes or locations of the elements shown.

DESCRIPTION OF THE PREFERRED EMBODIMENTS

The present invention is described with reference to preferred embodiments shown in FIG. 1, FIG. 1A and FIG. 2.

Figure 1:
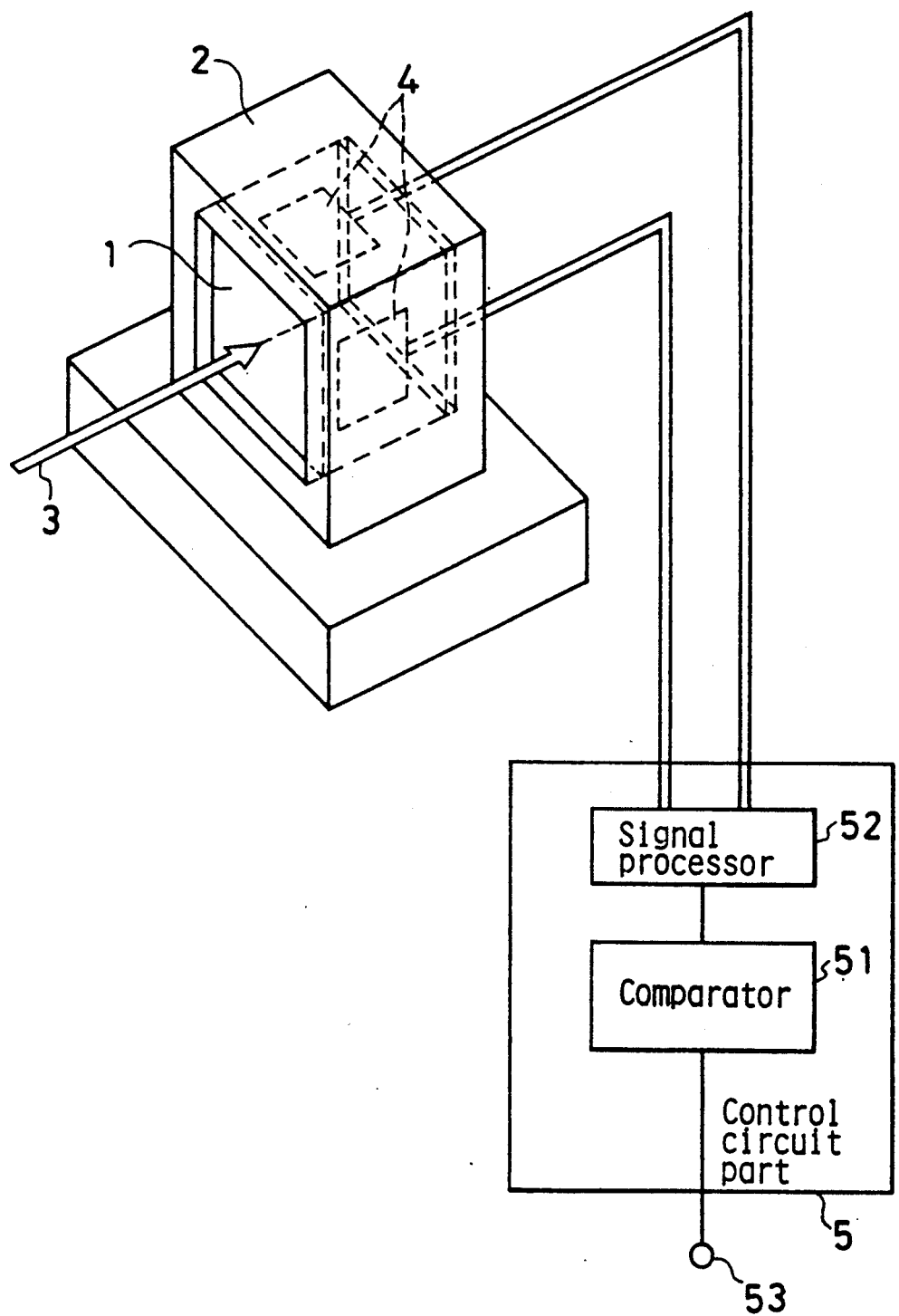
FIG. 1 is a perspective view with related circuit diagram of a first embodiment of the laser apparatus of the present invention.

FIG. 1 shows a first embodiment of the part of a frequency conversion element for a higher harmonics generation part of the laser apparatus.

As shown in FIG. 1, a frequency conversion element 1 is held in a holder 2 at a position to receive incident laser light 3 of fundamnetal lasing oscillation frequency. At least one strain gauge 4 is bonded to the surface of the frequency conversion element 1, and output of the strain gauge(s) 4 is led to a control circuit part 5. The control circuit part has a signal processor 52, wherein, by a bridge circuit 55 and an amplifier 56 shown in FIG. 1B, an output signal responding to thermal strain of the frequency conversion element 1 is produced, and the output signal is compared in a comparator 51 with a reference level which is produced from a datum stored in a memory in the control circuit part 5, and a control signal is issued from the comparator 51 when the strain signal, which represents the thermal strain of the frequency conversion element 1, becomes higher than a predetermined reference level. In general, the frequency conversion element 1 absorbs a part of the laser light 3 incident thereto and is heated by energy of the absorbed light. By the heating, a certain thermal distribution is produced in the frequency conversion element 1, and owing to difference of thermal expansions at different parts of the frequency conversion element 1, a thermally induced strain is produced on the surface of the frequency conversion element 1. Therefore, the strain gauge(s) 4, which is bonded on the surface of the element 1, detects such thermally induced strain of the frequency conversion element 1 as change of resistance. The change of the resistance is converted to change of electric signal by the signal processor 52. As power of the incident laser light increases, the thermal strain increases. The comparator 51 in the control circuit part 5 compares the output signal of the signal processor 52 responding to the strain of the frequency conversion element 1, and issues the control signal when the strain signal exceeds the reference level. The reference level is determined preliminarily so that the thermal strain of the frequency conversion element 1 is under a permissible or tolerable level which is very close to but under the breakdown point of the element. Such permissible level is theoretically and experimentally determined by ultilizing thermal stress analysis of the frequency conversion element 1.

Therefore, when the heat accumulates in the frequency conversion element during the use, and the thermal strain in the frequency conversion element 1 increases, the control signal is issued at the predetermined level of the thermal strain which is appropriately close to but under the level corresponding to the thermal strain of the breakdown of the element. And therefore, the control signal is appropriately issued at the condition of the frequency conversion element 1 so as to be not excessively below the permissible safety level, unlike the operation power limit of the conventional apparatus.

Figure 1A:
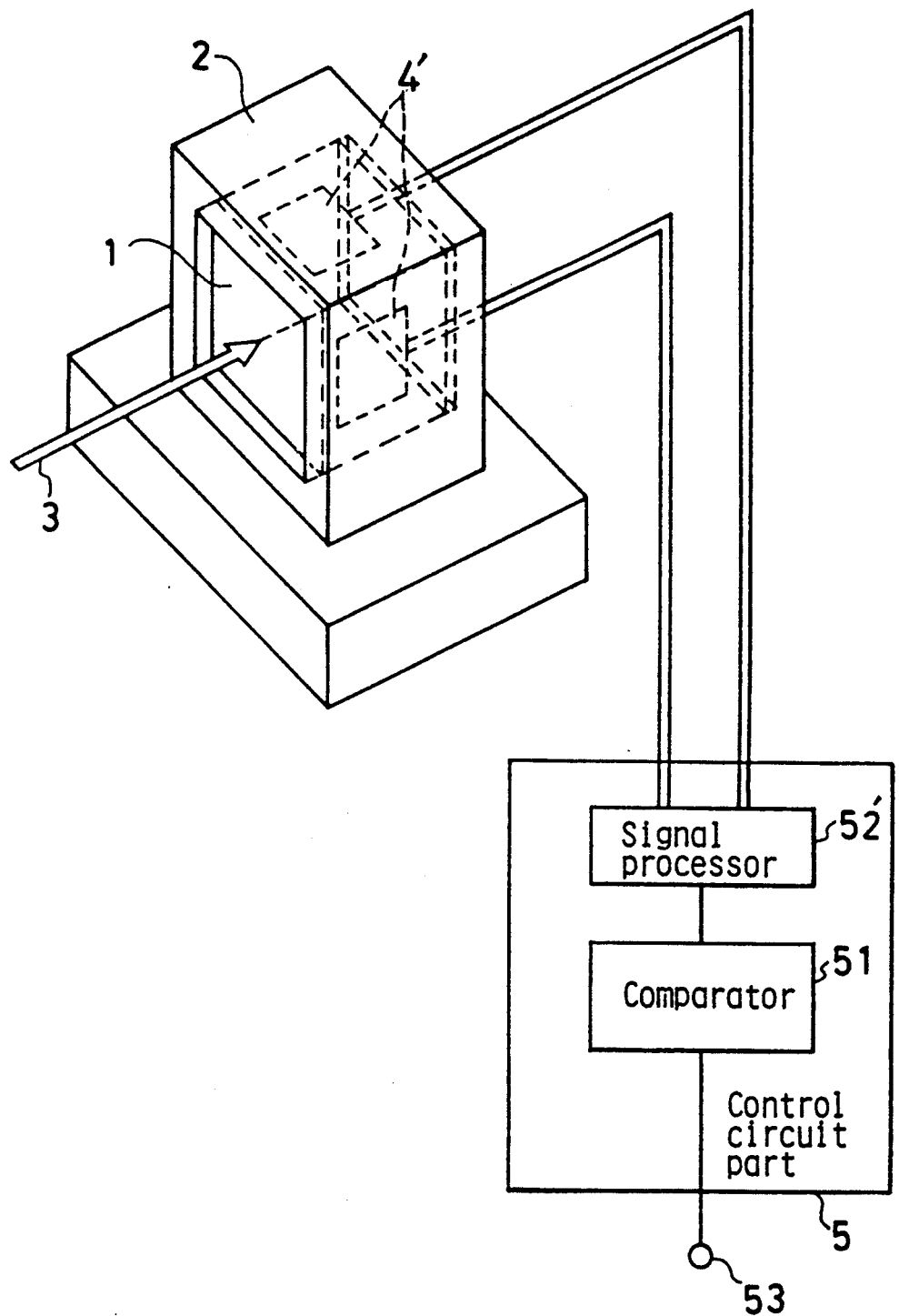
FIG. 1A is a perspective view with related circuit diagram of a modified embodiment of the present invention.
Figure 1B:
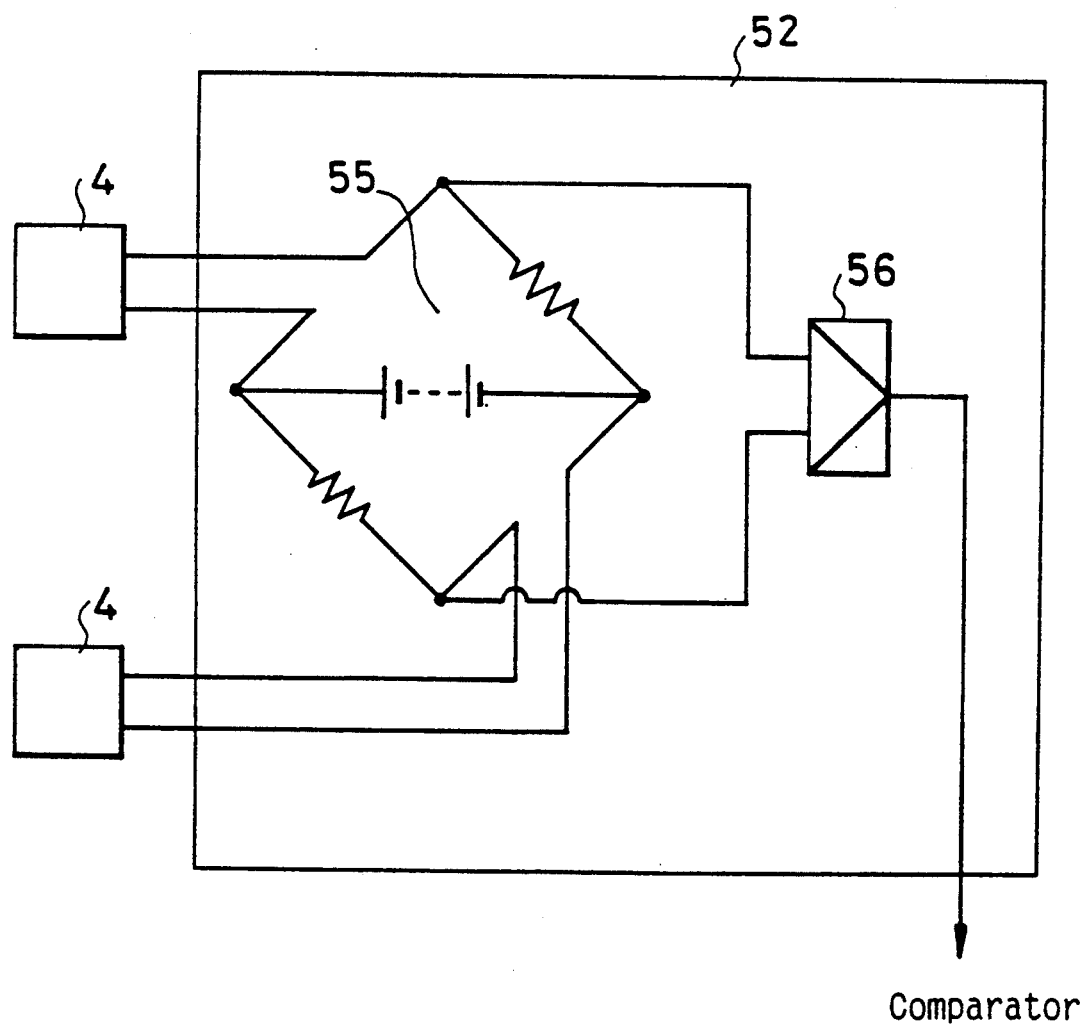
FIG. 1B is a circuit diagram of a prefered example of circuitry of a signal processor in the embodiments of FIG. 1.

FIG. 1A shows a modified embodiment. Corresponding parts and components to the first embodiment are shown by the same numerals and marks, and the description thereon made in the first embodiment similarly apply. Differences and features of this embodiment from the first embodiment are as follows. In this modified embodiment, at least one piezoelectric element 4' is fixed or bonded on the surface(s) of the frequency conversion element 1, and a signal processor 52' is to make a signal which corresponds to the thermally induced strain of the frequency conversion element 1 from the strain-induced piezoelectric output voltage(s) of the pizoelectric elements(s) 4'. The signal processor 52' is similarly constituted to that of FIG. 1B, but the polarities of the piezoelectric elements 4' should be carefully checked to be in the same direction.

Figure 2:
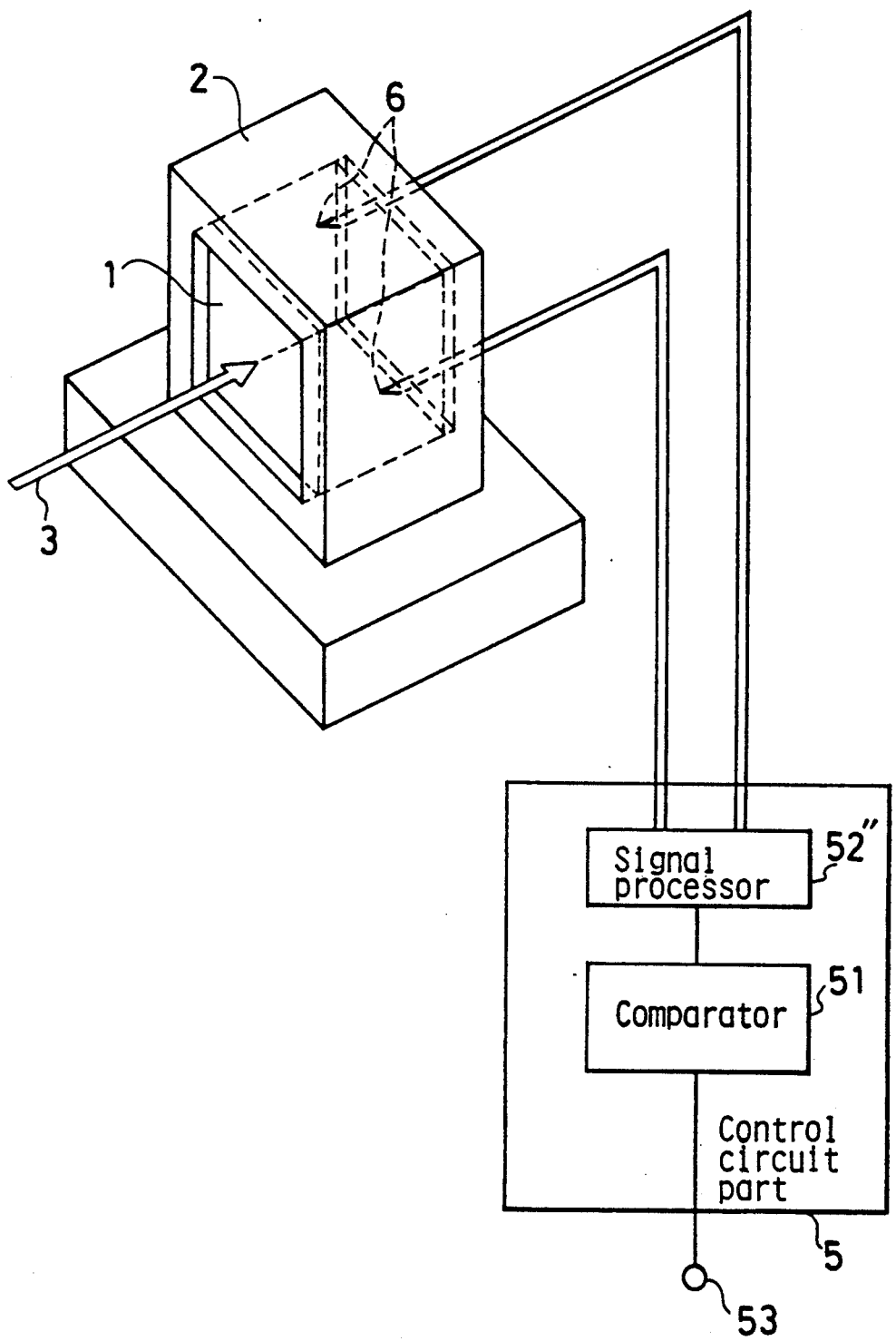
FIG. 2 is a perspective view with related circuit diagram of another preferred embodiment of the laser apparatus of the present invention.
Figure 3:
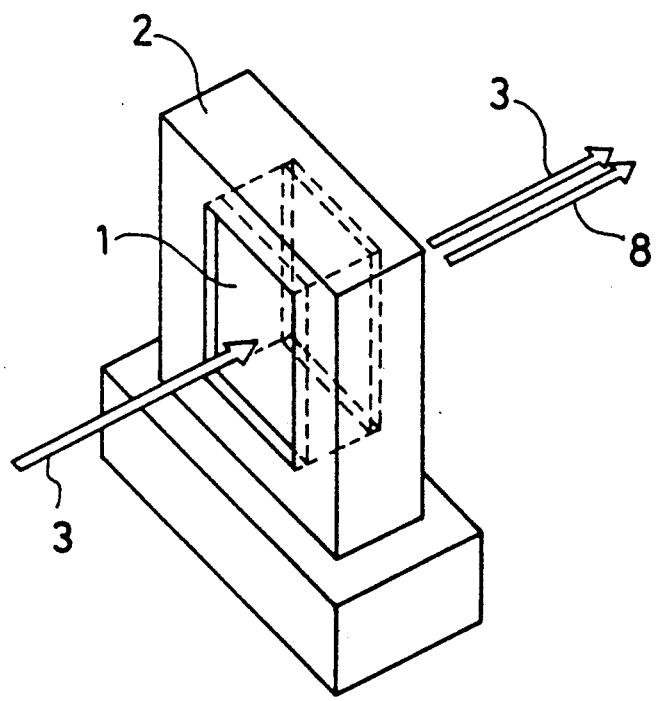
FIG. 3 is a perspective view showing the conventional example of the laser apparatus.

FIG. 2 shows another embodiment. Corresponding parts and components to the first embodiment are shown by the same numerals and marks, and the description thereon made in the first embodiment similarly apply. Differences and features of this embodiment from the first embodiment are as follows.

As shown in FIG. 2, a frequency conversion element 1 is held in a holder 2 at a position to receive incident laser light 3 of fundamental lasing oscillation frequency. At least one thermo-couple 6 is bonded to the surface of the frequency conversion element 1, and output(s) of the thermo-couple(s) 6 is led to a control circuit part 5. The control circuit part has a signal processor 52'', wherein by a bridge circuit and an amplifier an output signal responding to temperature rise of the frequency conversion element 1 is produced, and the output signal is compared in a comparator 51 with a referrence level which is produced from a datum stored in a memory in the control circuit part 5, and a control signal is issued from the comparator 51 when the strain signal, which represents temperature rise of the frequency conversion element 1, becomes higher than a predetermined reference level. In general, the frequency conversion element 1 absorbs a part of the laser light 3 incident thereto and is heated by energy of the absorbed light. By the heating, a certain temperature rise is induced inside the frequency conversion element 1, and owing to the temperature rise inside the frequency conversion elements 1, a temperature rise is induced on the surface of the frequency conversion element 1. Therefore, the thermocouple(s) 6, which is bonded on the surface of the element 1, detects such temperature rise of the frequency conversion element 1. The output(s) of thethermocouple(s) 6 is then converted to change of electric signal by the signal processor 52'. As power of the incident laser light increases, the surface temperature of the frequency conversion element rises. The comparator 51 in the control circuit part 5 compares the output signal of the signal processor 51' corresponding to the temperature rise of the frequency conversion element 1, and issues the control signal when the temperature signal exceeds the reference level. The reference level is determined preliminarily so that the temperature rise of the frequency conversion element 1 is under a permissible or tolerable level which is very close to but under the breakdown point of the element. Such permissible level is theoretically and experimentally determined by utilizing thermal stress analysis of the frequency conversion element 1. Therefore, when the heat accumulates in the frequency conversion element 1 during the use, and the temperature rise in the frequency conversion element 1 increases, the control signal is issued at the predetermined level of the temperature rise, which is appropriately close to but appropriately under the level corresponding to the temperature rise to cause the breakdown of the element. And therefore, the control signal is appropriately issued at the condition of the frequency conversion element 1 so as to be not excessively below the permissible threshold level, unlike the operation power limit of the conventional apparatus.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A laser apparatus comprising:
   a frequency conversion element for producing higher harmonic wave light by receiving light from a laser which is oscillating in fundamental frequency, and
   detection means, which is bonded on the surface of said frequency conversion element in order to detect surface temperature of said frequency conversion element.

2. A laser apparatus in accordance with claim 1, wherein said detection element is at least one strain gauge fixed to said frequency conversion element.

3. A laser apparatus in accordance with claim 1, wherein said detection element is at least one piezoelectric element fixed to said frequency conversion element.

4. A laser apparatus in accordance with claim 1, wherein said detection element is at least one thermocouple fixed to said frequency conversion element.

5. A laser apparatus in accordance with claim 1, 2, 3, or 4, which further comprises
   a signal processor for producing output data responding to said thermally induced change of said frequency conversion element and
   comparison means for comparing said output data with a predetermined reference level and issuing a control signal to decrease power of said light from said laser when said output data exceeds said predetermined reference level.

* * * * *